United States Patent
Whitcomb

[11] Patent Number: 5,918,520
[45] Date of Patent: Jul. 6, 1999

[54] STRAIGHT LINE SAW GUIDE

[76] Inventor: Robert W. Whitcomb, 111 Rana Villa Ave., Camp Hill, Pa. 17011

[21] Appl. No.: 09/001,436

[22] Filed: Dec. 31, 1997

[51] Int. Cl.[6] .......................... B23D 15/00; B23D 17/00; B23D 19/00; B26D 7/06
[52] U.S. Cl. .................................. 83/435.27; 83/435.11; 83/477.2
[58] Field of Search .......................... 83/435.27, 435.11, 83/437.1, 425, 477.2, 453, 464, 444, 442, 447; D8/64, 71, 72

[56] References Cited

U.S. PATENT DOCUMENTS

| D. 276,126 | 10/1984 | Fraser et al. ............................... D8/72 |
| 675,249 | 5/1901 | Sergeant ............................ 83/435.27 X |
| 2,801,652 | 8/1957 | Meeker .................................. 83/444 X |
| 2,985,202 | 5/1961 | Wilson ............................. 83/435.11 X |
| 3,101,104 | 8/1963 | Sullivan ................................. 83/447 X |
| 3,389,725 | 6/1968 | Tidwell ...................................... 83/444 |
| 4,367,668 | 1/1983 | Jensen .................................. 83/477.2 X |
| 4,408,509 | 10/1983 | Winchip .............................. 83/477.2 X |
| 4,469,318 | 9/1984 | Slavic .................................... 83/447 X |
| 4,481,846 | 11/1984 | Goodell .............................. 83/477.2 X |
| 4,593,590 | 6/1986 | Gray .................................... 83/477.2 X |
| 4,628,782 | 12/1986 | Park .................................... 83/477.2 X |
| 4,934,423 | 6/1990 | Withrow ............................. 83/477.2 X |
| 4,962,685 | 10/1990 | Hagstrom .............................. 83/444 X |
| 5,058,474 | 10/1991 | Herrera .................................. 83/477 X |
| 5,722,308 | 3/1998 | Ceroll et al. ....................... 83/477.2 X |

Primary Examiner—M. Rachuba
Assistant Examiner—John C. Wegand

[57] ABSTRACT

A straight line saw guide is provided including a base slidable along a table saw. A movable top is slidably situated on a top face of the base and further adapted to be fixed with respect thereto. The movable top is adapted to move in a direction perpendicular with respect to the movement of the base. Further, the movable top serves to abut a piece of wood situated on the base. Finally, at least one clamp assembly is included for maintaining the piece of wood fixed with respect to the base and movable top.

7 Claims, 2 Drawing Sheets

STRAIGHT LINE SAW GUIDE

BACKGROUND OF THE INVENTION

1. Field of the Invention

The present invention relates to power tool guide assemblies and more particularly pertains to a new straight line saw guide for cutting straight edges on warped or deformed planks of wood.

2. Description of the Prior Art

The use of power tool guide assemblies is known in the prior art. More specifically, power tool guide assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art power tool guide assemblies include U.S. Pat. No. 4,628,782; U.S. Pat. No. 5,176,058; U.S. Pat. No. 5,367,933; U.S. Pat. No. 5,148,846; U.S. Pat. No. 3,587,680; and U.S. Pat. Des. 333,768.

In these respects, the straight line saw guide according to the present invention substantially departs from the conventional concepts and designs of the prior art, and in so doing provides an apparatus primarily developed for the purpose of cutting straight edges on warped or deformed planks of wood.

SUMMARY OF THE INVENTION

In view of the foregoing disadvantages inherent in the known types of power tool guide assemblies now present in the prior art, the present invention provides a new straight line saw guide construction wherein the same can be utilized for cutting straight edges on warped or deformed planks of wood.

The general purpose of the present invention, which will be described subsequently in greater detail, is to provide a new straight line saw guide apparatus and method which has many of the advantages of the power tool guide assemblies mentioned heretofore and many novel features that result in a new straight line saw guide which is not anticipated, rendered obvious, suggested, or even implied by any of the prior art power tool guide assemblies, either alone or in any combination thereof.

To attain this, the present invention generally comprises a base with a rectangular configuration having a top face, a bottom face, and a periphery formed therebetween. The base is defined by a pair of long edges and a pair of short edges. The base has a plurality of linearly aligned apertures formed therethrough adjacent to one of the long edges thereof. As shown in FIG. 2, the bottom face has a thin guide formed along a length thereof for sliding along a saw table. The top face has a plurality of spaced inset rulers situated flush therewith and extending between the short edges thereof. Next provided is a movable top with a rectangular configuration having a top face, a bottom face, and a periphery formed therebetween. Similar to the base, the movable top is defined by a pair of long edges and a pair of short edges. The movable top has a plurality of elongated slots formed therethrough between the short edges of the movable top. The movable top further includes a plurality of tightening grips each situated between an associated one of the slots and the apertures. As shown in FIG. 3, the tightening grips are adapted for allowing the movable top to slide between the long edges of the base. The tightening grips further permit the selective fixing of their respective position. A plurality of aligned gripping knobs are each fixedly mounted adjacent to one of the long edges of the movable top in alignment with a corresponding one of the slots. An inverted F-shaped metallic fence is mounted on one of the long edges of the movable top opposite the gripping knobs. As shown in FIG. 2, the fence extends upwardly a height twice that of the movable top. Finally, a plurality of clamp assemblies are each positioned on the top face of the movable top. The clamp assemblies are situated between a pair of associated slots, the fence and the gripping knobs. Each clamp assembly includes an engagement arm having an inboard end pivotally coupled about an axis perpendicular to the short edges of the movable top. A disk member has a threaded rod fixed in concentric relationship therewith. The disk member is in turn threadedly coupled to a threaded aperture formed in an outboard end of the engagement arm. See FIG. 2. An actuator arm is provided having an inboard end pivotally coupled about an axis perpendicular to the short edges of the movable top and adjacent to the engagement arm. In use, the actuator arm has a vertically oriented orientation for maintaining the engagement arm in a vertical orientation and a depressed horizontal orientation for forcing the engagement arm downwardly in an opposite direction. As such, the disk member engages a piece of wood resting on the base and abutting the fence. By this design, the base, movable top and piece of wood may be slid along the saw table for cutting purposes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new straight line saw guide apparatus and method which has many of the advantages of the power tool guide assemblies mentioned heretofore and many novel features that result in a new straight line saw guide which is not anticipated, rendered obvious, suggested, or even implied by any of the prior art power tool guide assemblies, either alone or in any combination thereof.

It is another object of the present invention to provide a new straight line saw guide which may be easily and efficiently manufactured and marketed.

It is a further object of the present invention to provide a new straight line saw guide which is of a durable and reliable construction.

An even further object of the present invention is to provide a new straight line saw guide which is susceptible of a low cost of manufacture with regard to both materials and labor, and which accordingly is then susceptible of low prices of sale to the consuming public, thereby making such straight line saw guide economically available to the buying public.

Still yet another object of the present invention is to provide a new straight line saw guide which provides in the apparatuses and methods of the prior art some of the advantages thereof, while simultaneously overcoming some of the disadvantages normally associated therewith.

Still another object of the present invention is to provide a new straight line saw guide for cutting straight edges on warped or deformed planks of wood.

Even still another object of the present invention is to provide a new straight line saw guide that includes a base slidable along a table saw. A movable top is slidably situated on a top face of the base and further adapted to be fixed with respect thereto. The movable top is adapted to move in a direction perpendicular with respect to the movement of the base. Further, the movable top serves to abut a piece of wood situated on the base. Finally, at least one clamp assembly is included for maintaining the piece of wood fixed with respect to the base and movable top.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
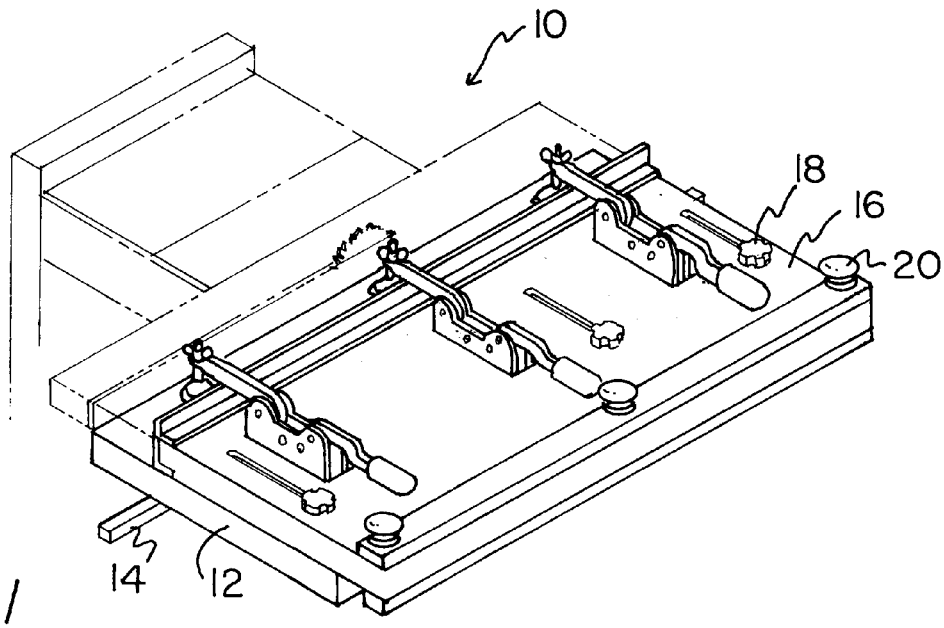
FIG. 1 is a perspective view of a new straight line saw guide according to the present invention.

With reference now to the drawings, and in particular to FIGS. 1 through 4 thereof, a new straight line saw guide embodying the principles and concepts of the present invention and generally designated by the reference numeral 10 will be described.

Figure 2:
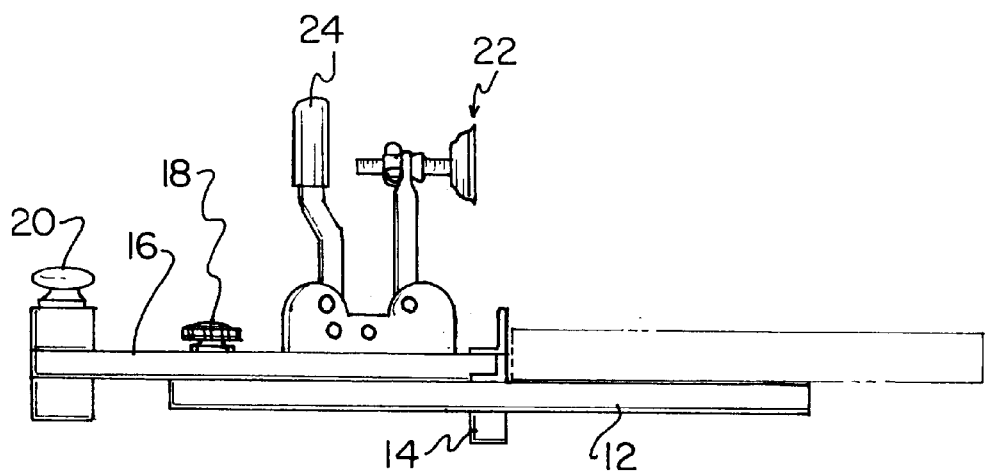
FIG. 2 is a side view of the present invention.

The present invention, designated as numeral 10, includes a base 12 with a rectangular configuration having a top face, a bottom face, and a periphery formed therebetween. The base is defined by a pair of long edges and a pair of short edges. The base has a plurality of linearly aligned apertures 13 formed therethrough adjacent to one of the long edges thereof. As shown in FIG. 2, the bottom face has a thin guide 14 formed along a length thereof for sliding along a saw table. The guide extends past the short edges of the base by at least 12 inches. The top face has a plurality of spaced inset rulers 15 situated approximately flush therewith and extending between the short edges thereof.

Next provided is a movable top 16 with a rectangular configuration having a top face, a bottom face, and a periphery formed therebetween. Similar to the base, the movable top is defined by a pair of long edges and a pair of short edges. Preferably, the movable top has a size and shape similar to that of the base. The movable top has a plurality of elongated slots 17 formed therethrough between the short edges thereof.

Figure 3:
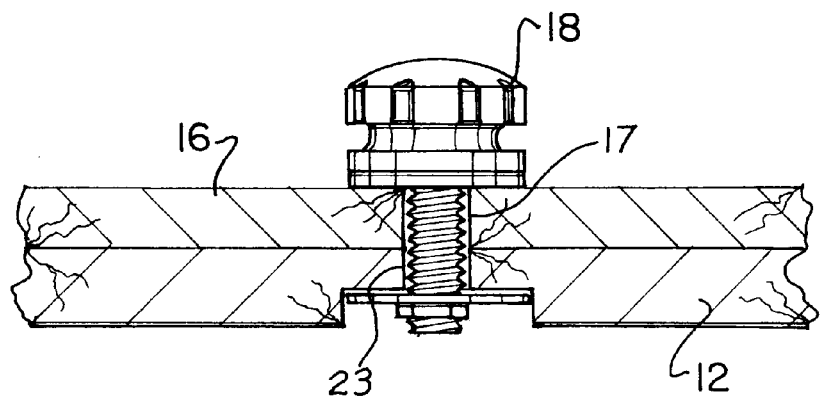
FIG. 3 is a close-up cross-sectional view of the present invention.
Figure 4:
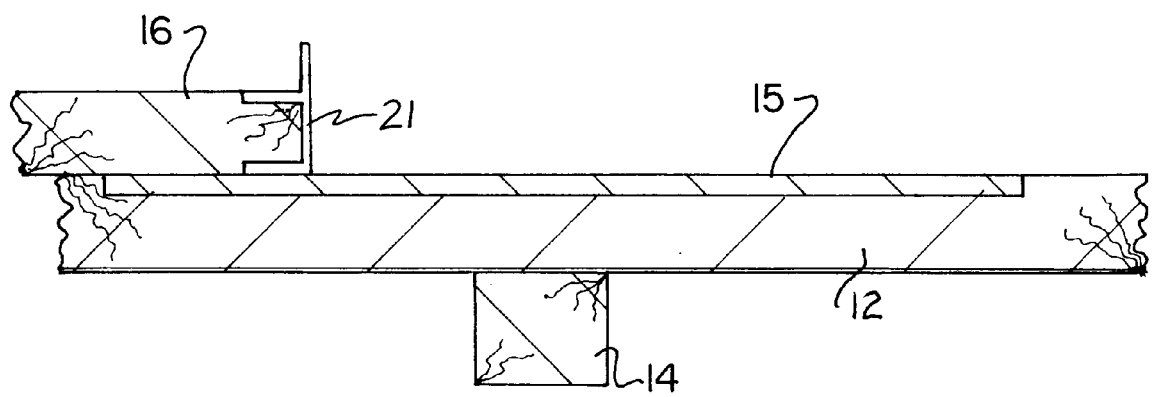
FIG. 4 is a cross-sectional view of the present invention.

The movable top further includes a plurality of tightening grips 18 each situated between an associated one of the slots and the apertures of the movable top and base, respectively. As shown in FIG. 3, the tightening grips are adapted for allowing the movable top to slide between the long edges of the base. To accomplish this, the tightening grip includes a knob with a threaded bolt coupled thereto and extended downwardly therefrom. A nut is threadedly coupled to the bolt for clamping the movable top and base together thereby fixing their respective position. FIG. 3 further shows the base to have a circular recess formed in the bottom face thereof in coaxial relationship with the aperture for receiving a washer.

A plurality of aligned gripping knobs 20 are each fixedly mounted adjacent to one of the long edges of the movable top in alignment with a corresponding one of the slots. An inverted F-shaped metallic fence 21 is mounted on one of the long edges of the movable top opposite the gripping knobs. As shown in FIG. 2, the fence extends upwardly a height at least twice that of the movable top. FIGS. 1 & 2 show the movable top having a stopper strip mounted along one of the long edges thereof beneath the gripping knobs.

Finally, a plurality of clamp assemblies 22 are each positioned on the top face of the movable top. The clamp assemblies are situated between a pair of associated slots, the fence and the gripping knobs. Each clamp assembly includes an engagement arm 23 having an inboard end 25 pivotally coupled about an axis perpendicular to the short edges of the movable top. A disk member has a threaded rod fixed in concentric relationship therewith. By this structure, the disk member is threadedly coupled to a threaded aperture formed in an outboard end 27 of the engagement arm. See FIG. 2.

Each clamp assembly further includes an actuator arm 24 having an inboard end 28 pivotally coupled about an axis perpendicular to the short edges of the movable top and adjacent to the engagement arm. In use, the actuator arm has a vertically oriented orientation for maintaining the engagement arm in a vertical orientation and a depressed horizontal orientation for forcing the engagement arm downwardly in an opposite direction. Conventional lever action is used to accomplish such function. As such, the disk member engages a piece of wood resting on the base and abutting the fence. By this design, the base, movable top and piece of wood may be slid along the saw table for cutting purposes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A straight line saw guide comprising, in combination:

a base with a rectangular configuration having a top face, a bottom face, and a periphery formed therebetween defined by a pair of long edges and a pair of short edges, the base having a plurality of linearly aligned apertures formed therethrough adjacent to one of the long edges thereof, the bottom face having a thin guide formed along a length thereof for sliding along a saw table, the top face having a plurality of inset rulers situated flush therewith and extending between the short edges thereof;

a movable top with a rectangular configuration having a top face, a bottom face, and a periphery formed therebetween defined by a pair of long edges and a pair of short edges, the movable top having a plurality of elongated slots formed therethrough between the short edges of the movable top, the movable top further including a plurality of tightening grips each situated between an associated one of the slots and the apertures for allowing the movable top to slide between the long edges of the base and further permitting the selective fixing of their respective position, a plurality of aligned gripping knobs each fixedly mounted adjacent to one of the long edges thereof in alignment with a corresponding one of the slots, and an inverted F-shaped metallic fence mounted on one of the long edges of the movable top opposite the gripping knobs and extending upwardly a height twice that of the movable top; and a plurality of clamp assemblies each positioned on the top face of the movable top between a pair of associated slots, the fence and the gripping knobs, each clamp assembly including an engagement arm having an inboard end pivotally coupled about an axis perpendicular to the short edges of the movable top, a disk member having a threaded rod fixed in concentric relationship therewith which is in turn threadedly coupled to a threaded aperture formed in an outboard end of the engagement arm, an actuator arm having an inboard end pivotally coupled about an axis perpendicular to the short edges of the movable top and adjacent to the engagement arm, wherein the actuator arm has a vertically oriented orientation for maintaining the engagement arm in a vertical orientation and a depressed horizontal orientation for forcing the engagement arm downwardly in an opposite direction such that the disk member engages a piece of wood resting on the base and abutting the fence, whereby the base, movable top and piece of wood may be slid along the saw table for cutting purposes.

2. A straight line saw guide comprising:

a base slidable along a saw table;

a movable top slidably situated on a top face of the base and further adapted to be fixed with respect thereto, wherein the movable top is adapted to move in a direction perpendicular with respect to the movement of the base, the movable top adapted to abut a piece of wood situated on the base; and at least one clamp assembly for maintaining the piece of wood fixed with respect to the base and movable tops;

wherein the movable top has at least one gripping knob situated thereon.

3. A straight line saw guide as set forth in claim 2 wherein the movable top is fixed to the base by way of a plurality of tightening grips.

4. A straight line saw guide as set forth in claim 2 wherein the movable top has a metallic fence mounted thereon with a height twice that of the movable top.

5. A straight line saw guide as set forth in claim 2 wherein the base has at least one ruler mounted therein and flush therewith.

6. A straight line saw guide as set forth in claim 2 wherein the clamp assembly includes an engagement arm having an inboard end pivotally coupled about a horizontal axis and an adjustable disk member coupled to an outboard end of the engagement arm.

7. A straight line saw guide as set forth in claim 6 and further including an actuator arm having an inboard end pivotally coupled about a horizontal axis adjacent to the engagement arm, wherein the actuator arm has a vertically oriented orientation for maintaining the engagement arm in a vertical orientation and a depressed horizontal orientation for forcing the engagement arm downwardly in an opposite direction such that the disk member engages the piece of wood resting on the base and abutting the fence.

* * * * *